(12) United States Patent
Melanson

(10) Patent No.: US 6,256,776 B1
(45) Date of Patent: Jul. 3, 2001

(54) DIGITAL SIGNAL PROCESSING CODE DEVELOPMENT WITH FIXED POINT AND FLOATING POINT LIBRARIES

(76) Inventor: John L. Melanson, 7937 Sagebrush Ct., Boulder, CO (US) 80301

( * ) Notice: Subject to any disclaimer, the term of this patent is extended or adjusted under 35 U.S.C. 154(b) by 0 days.

(21) Appl. No.: 09/054,381

(22) Filed: Apr. 2, 1998

(51) Int. Cl.[7] .................................................. G06F 9/45
(52) U.S. Cl. .................................................. 717/4; 717/8
(58) Field of Search .............................. 717/1–10; 714/38

(56) References Cited

U.S. PATENT DOCUMENTS 5,933,641 * 8/1999 Ma ............................................ 717/5
5,960,201 * 9/1999 Ma et al. .................................. 717/5

OTHER PUBLICATIONS

Bigrigg et al., "DSP Programming: It's Not Just Assembler Anymore," Embedded Systems Programming, pp(5), Oct. 1995.*

* cited by examiner

*Primary Examiner*—St. -John Courtenay, III
(74) *Attorney, Agent, or Firm*—Fenwick & West LLP

(57) ABSTRACT

A code development system for developing code for execution by a digital signal processor (DSP) comprising circuitry for performing fixed point arithmetic includes a library comprising a plurality of first variable types, corresponding to fixed point functions, which generate numerical results equal to numerical results generated by fixed point circuitry in the DSP. The library further comprises a plurality of second variable types, corresponding to floating point functions, which are associated with the first variable types, to provide desired numerical results during code development. The code development system includes a compiler, which is responsive to development code, for generating development object code in accordance with the first variable types and the second variable types. Test data is then provided to the development object code which provides data generated by the first and second variable types. The results can be examined and the code altered to make the data produced by the first variable types closer to the desired data produced by the second variable types.

19 Claims, 2 Drawing Sheets

DIGITAL SIGNAL PROCESSING CODE DEVELOPMENT WITH FIXED POINT AND FLOATING POINT LIBRARIES

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of digital signal type processors and more particularly to code development for execution by such processors.

DESCRIPTION OF THE RELATED ART

Many computer applications are incorporating mathematically intensive operations that are performance critical. For example, many image and speech processing applications must perform mathematically intensive operations, such as filtering, in real-time. Generally, such applications make use of a digital signal processor (DSP). As is well known, DSPs implement instructions that are particularly useful and efficient in digital signal processing applications. An example of a DSP is the TMS320 series of DSPs available from Texas Instruments. In addition to specialized DSPs, certain general purpose microprocessors incorporate DSP type instructions, such as the MMX instructions implemented by certain processors in the Pentium series of processors available from the Intel Corporation.

Traditionally, development of applications that execute efficiently on a DSP has required software developers that are highly skilled in both assembly language and sophisticated numerical analysis. The development of higher level languages and computer-aided software engineering (CASE) tools has simplified DSP program development to some extent. Compilers for programming languages such as the C programming language facilitate DSP code development by reducing or eliminating the need for programmers to be familiar with assembly language programming of a particular DSP. CASE tools such as the Simulink product available from the MathLab Corporation provide a prototyping bench for DSP code development, as well as for algorithm design.

Such tools however, do not address a very difficult part of the design process—the management of fixed point arithmetic. Development of programs that efficiently utilize fixed point capabilities of a DSP to generate numerically accurate results within the necessary time constraints is a critical aspect of DSP program development, and is one of the most difficult tasks faced by DSP programmers. Another difficult task is developing applications using floating point arithmetic where the word length of the underlying DSP is shorter than might be desired.

In many applications it is not necessary to understand the idiosyncrasies of fixed point math. Use of a floating point library in such applications, to utilize floating point circuitry within a DSP, simplifies code development and is an acceptable solution. DSPs with extensive floating point circuitry generally cost more than those without such support. Moreover, floating point operations take more time, for the same piece of hardware, than fixed point operations. This solution is therefore not acceptable when the application needs to run in real time at the fastest possible rate, or on the least expensive piece of hardware. Developing applications for DSPs in such situations requires either a very long development path, or the services of a rare, highly skilled DSP code developer. The result is higher development costs for DSP applications. What is needed therefore is a development environment that simplifies development of DSP code.

BRIEF SUMMARY OF THE INVENTION

In accordance with a principal aspect of the invention, code development for a target DSP is improved by way of a code library that provides fixed point functions with associated floating point functions that shadow the fixed point functions. The fixed point functions provide results that accurately match those provided by the target DSP. The floating point functions provide numerically accurate results that can be used as benchmark results for comparison with the results provided by the fixed point library. The code for the target DSP can then be modified to provide more accurate results from the fixed point libraries.

An advantage of certain preferred embodiments is that code generation for execution by fixed point circuitry of a DSP is simplified by providing a fast and easy comparison between desired numerical results, and actual results produced by the code on the target DSP. The target code can then be incrementally modified to provide results that are closer to the desired results. When the code is deemed to provide acceptable fixed point results, the code is recompiled to include only fixed point code. The floating point functions, and any debug functions are therefore not a part of the final production code. Code development is therefore simplified, allowing shorter development times and leading to lower development costs. Overall, recurring, system costs are also reduced by facilitating use of the least expensive hardware required for a particular application.

These and other features and advantages may be better understood by reference to the following detailed description.

DETAILED DESCRIPTION OF THE PREFERRED EMBODIMENTS

Figure 1:
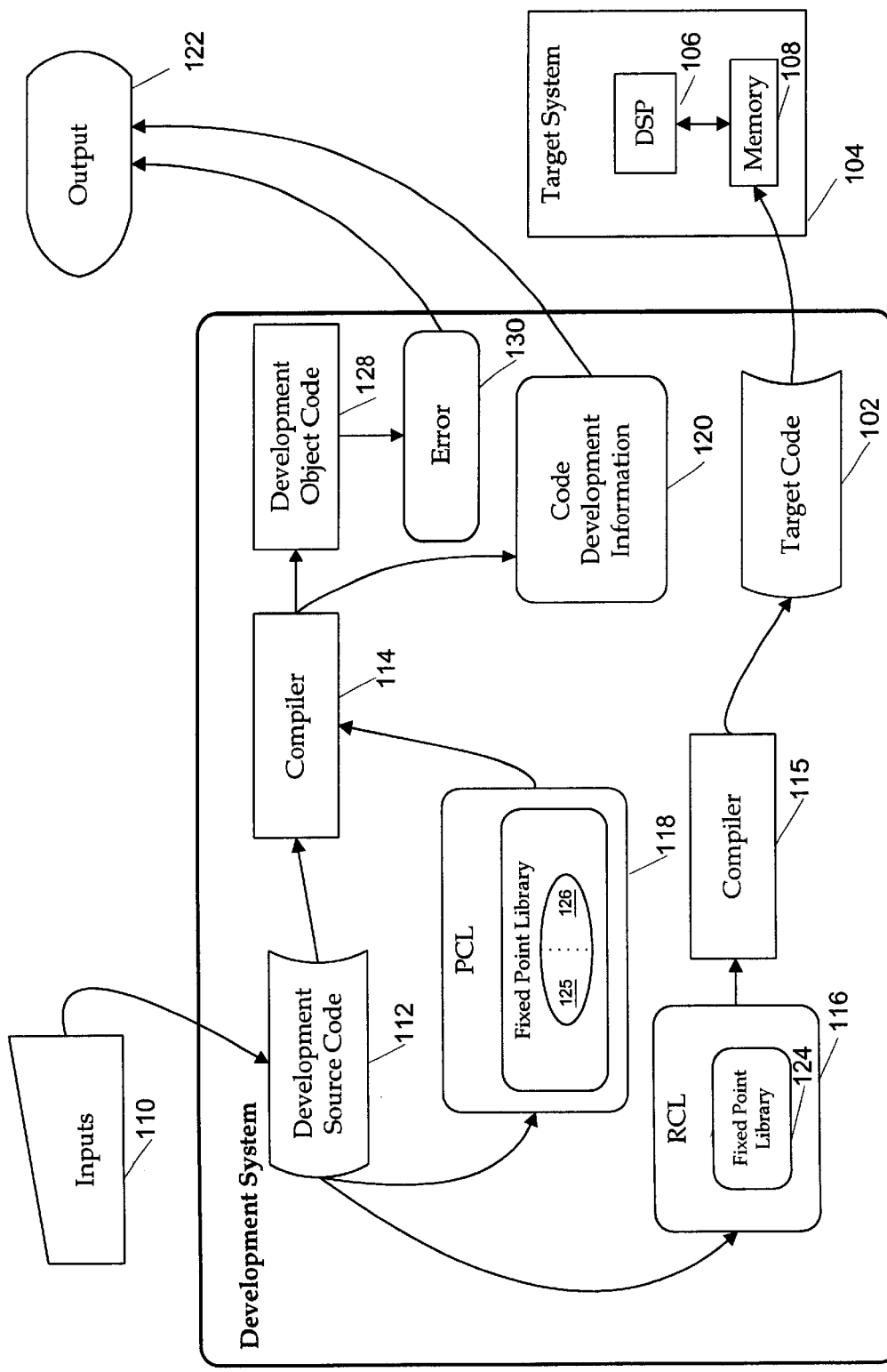
FIG. 1 is a block diagram of a preferred embodiment that employs the principles of the present invention.

In FIG. 1, a development system 100 facilitates development of target code 102 for execution by a target system 104. Target system 104 includes a DSP 106 that executes the target code 102 stored in memory 108. Target system 104 typically also includes one or more input and output devices (not shown). Development system 100 is preferably implemented as one or more stored programs executed by a general purpose digital computer. Inputs 110 entered by a programmer using development system 100 generate development source code 112. Entry of development source code 112 may be performed in a conventional manner such as by use of a conventional text editor that allows entry, display, retrieval and storage of data. Development object code 128 is generated by compiler 114 by way of library 118. Target code 102 is generated by compiler 115 by way of library 116. Compiler 114 also generates code development information 120 which comprises debug information useful for debug and analysis of development code 112. The debug information may be outputted to an output device 122 such as a conventional computer monitor for examination and evaluation by a programmer.

Library 116 advantageously provides fixed point functions 124 for use by compiler 115 to generate target code 102. Library 116, herein designated as a Runtime Class Library (RCL), contains fixed point functions 124 to implement variable types that operate exactly like the DSP 106 in the target system 104. For example, RCL 116 can contain a 16-bit signed fraction variable type with a range $-1<=X<1$. In other words, the binary point is between the sign bit and the 15 lower bits. This is the way that data is typically represented in a 16-bit fixed point DSP. In such a variable type, small numbers (e.g., less than 1/256) are typically inaccurate because of rounding. Large numbers typically either saturate (change to +−1) or wrap around, depending on the exact type of DSP 106. The errors generated by such variable types can increase dramatically after a series of operations on a particular variable, thus decreasing the accuracy with which the target application operates.

Library 118, herein referred to as a Prototyping Class Library (PCL), contains fixed point functions, one of which is shown at 125, which are the same as fixed point functions 124 in RCL 116. Each fixed point function 125, has associated therewith a floating point function 126 to provide numerically accurate results for mathematical operations implemented in development code 112. Compiler 114 advantageously generates development object code 128 which implements mathematical operations contained in development source code 112 in both fixed point and floating point form. The floating point functions 126 are "shadowed" or associated with fixed point functions 125 to automatically cause generation by compiler 114 of floating point code that generates highly accurate numerical values to be used as benchmarks against which fixed point code can be compared. The differences between numerical values generated by such floating point and fixed point components of development object code 128 are generated by error module 130 in a manner which is shown in further detail in FIG. 2.

Figure 2:
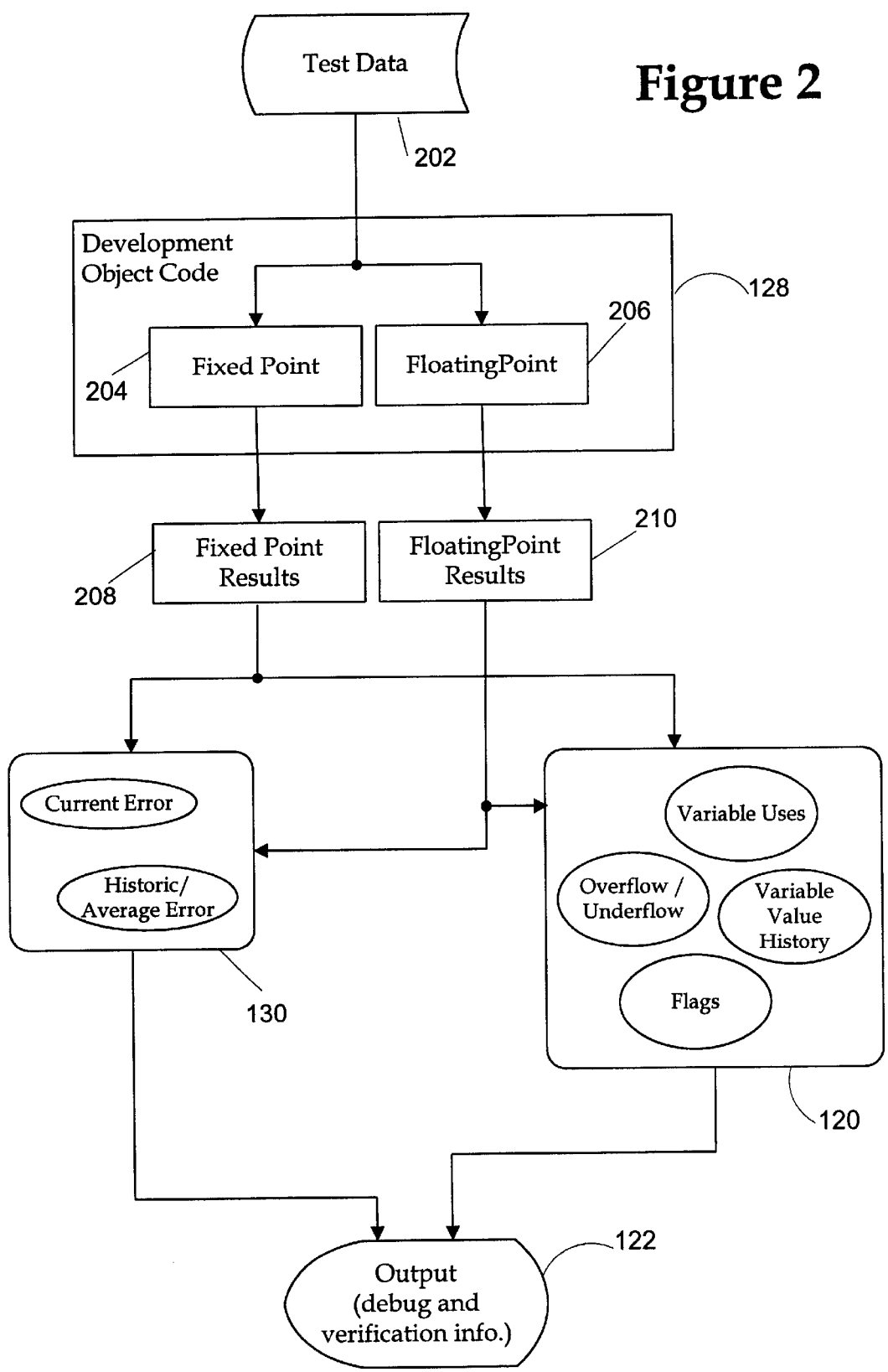
FIG. 2 shows further details of portions of FIG. 1.

FIG. 2 illustrates, in block diagram form, operation of development object code 128. As shown, development object code 128 includes fixed point functions 204 and shadowed floating point functions 206. Fixed point functions 204 are generated by way of fixed point library 125 and floating point functions 206 are generated by way of floating point library 126. Once development object code 128 is generated, test data 202 is supplied to code 128 to provide fixed point results 208 and floating point results 210 which are used to determine the operability and accuracy of code 128. This is advantageously achieved by modules 120 and 130. Debug information module 120 provides information indicative of certain aspects of code 128. For example, module 120 includes flags, such as flags for saturation and wrap-around. Flags to indicate underflow and overflow are also provided. Debug information 120 also preferably includes variable history, such as the last hundred values for some or all variables, and flags for number of uses of one or more variables.

Error module 130 advantageously generates values indicative of differences between certain variables in code 128 as generated by fixed point functions 204 and shadowed floating point functions 206. Included among such values are a current error value, for each variable, indicative of a current error between a fixed point variable and a corresponding floating point variable, and a historic/average error for each variable, indicative of a Root Mean Squared (RMS) error between a fixed point variable and a corresponding floating point variable. Such error values for each of the variables is then provided as debug and verification information by way of output 122 for viewing by the programmer. The programmer may then modify development code 112 to cause the fixed point library 116 to generate fixed point results 208 that are closer to the shadowed floating point results 210. Preferably, such a procedure is performed iteratively until the fixed point results 208 are deemed to be acceptable. When this occurs, compiler 115 is then used to generate target code 102 from development code 112 using RCL 116.

Preferably, libraries 116 and 118 are implemented in an object oriented programming language such as the C++ language. Such an implementation takes advantage of the encapsulation and inheritance features inherent in most object oriented programming languages. Fixed point functions 125 in PCL 118 are each implemented as an object, which contains therein associated, or shadowed, floating point function 126. The fixed point functions 125 each therefore have associated therewith an encapsulated floating point function that is automatically generated by compiler 114 into floating point functions 206 to cause generation of floating point results 210.

Compiler 114 preferably takes the form of a conventional C++ compiler. Advantageously, no modifications need to be made to the compiler 114 because of the manner in which the PCL 118 is implemented. The term "compiler" as used herein is understood to include the functionality necessary to generate object code from source code. Preferably compiler 114 operates in a manner to automatically generate fixed point and floating point functions 204 and 206 without further intervention from the programmer. For purposes of explanation, libraries 116 and 118 are shown in FIG. 1 as separate blocks. The exact implementation of the libraries 116 and 118 is not critical. The libraries 116 and 118 may be implemented as a single library, or as two libraries as shown in FIG. 1, or in other manners. Libraries 125 and 126 should however be available to compiler 114 to allow generation of fixed point and floating point results 208 and 210.

Additional tools, may be added to further facilitate DSP code development. For example, tools that aid in viewing variables may be used to assist or replace variable interpretation by the code developer.

Operation of the system described above in conjunction with FIGS. 1 and 2 may be better understood by considering the following example of a second order recursive filter, with two poles. Such a filter can be described as follows:

$$out_n = b2*out_{n-2} + b1*out_{n-1} + a0*in_n$$

where in is the vector of input data, out is a (recursively defined) vector of output data, and b1,b2 and a0 are coefficients defining the frequency response of the filter.

This is called the direct form implementation of the filter. This filter is approximately equivalent to an analog LC filter. Typically, such a filter is not well behaved with certain coefficients when implemented with fixed point mathematical functions such as represented by fixed point library 124. Those coefficients generally correspond to high Q and low frequency filter types.

If the direct form filter, as expressed above, does not perform adequately, then two possible solutions can be investigated. The first solution is to use double precision arithmetic for all or some of the variables. This incurs a performance penalty with most DSPs and therefore cannot be considered lightly. The second solution is to use an alternate form of the filter, such as a state variable formulation. It is well known that state variable IIR filters are more numerically robust than the equivalent direct form filter, especially when the frequency is low and the Q is high. This is often the case for bass filters for digital audio applications. The state variable definition can be expressed as follows:

$$out_n = a1*in_n + b1*out_{n-1} - b2*s2_{n-1}$$

$$s2_n = a2*in_n + b2*out_{n-1} + b1*s2_{n-1}$$

where in is the vector of input data, out is the (recursively defined) vector of output data, s2 is an internal state vector, and b1, b2, a1 and a2 are coefficients defining the frequency response of the filter (not the same as the coefficients in the prior case).

It will be noted that this formulation requires six multiplies instead of the three for the prior case. If this filter was used in a larger program, and the program was not performing adequately, it would be very difficult to determine whether the filter was the source of the problem. In a system employing the principles described above in connection with FIGS. 1 and 2, the source of the problem can be determined much more easily, by examining the differences between values for variables generated by fixed point and floating point functions 204 and 206. Advantageously, this can save a significant amount of development time.

The following example C++ program shows more clearly the advantages of the embodiments described herein. The code creates an equivalent filter both ways. Random data, corresponding to test data 202, is then passed through both filters (corresponding to fixed point and floating point functions 204 and 206). The last ten results are provided to output 122 for observation. The filters were written with no regard for the type of analysis shown in FIG. 2. This advantageously occurs in the "background" because of the structure of the class definitions for the fixed point library 125.

Copyright 1997 Audiologic, Inc.

```
//************************************************************
void main () {
    int i;
// create a simple two pole filter in both state variable and direct form.
// Spec for poles
    double radius =.999;
    double angle = 2*3.14159265359*.003;
// make coefficients for a direct form filter
    f2_16 dir_b1=2*radius*cos (angle);
    f1_16 dir_b2=-radius*sin (angle);
    f1_16 dir_a0=1-radius;
// make coefficients for a state variable form filter
    f1_16 state_b1=radius*cos (angle);
    f1_16 state_b2=-radius*radius;
    f1_16 state_a1=1-radius;
    f1_16 state_a2=-1*(1-radius) *cos (angle)/sin (angle);
// make a random input vector
    f1_16 in_data [1000] ;
    for (i=0;i<1000;i++) in_data [i] = (2.*rand()/(double)
    RAND_MAX-1)*.1;
    cout<<"\n";
// Process the data through a second order direct form filter
// show the final ten results
    cout<<"\ndirect form results \n\n";
    f1_16 z1=0., z2=0.,out;
    for (i=0; i<1000; i++) {
        out=dir_b2*z2+dir_b1*z1+dir_a0*in_data[i] ;
        z2=z1;
        z1=out;
```

```
-continued if (i>=990) out.show ();
    }
    cout<<"\n";
// Now process the data through a second order state variable form filter
// Again, show the last ten results
    cout<<"\nState variable results \n\n";
    f1_16 s1=0.,s2=0.,temp;
    for (i=0;i<1000;i++) {
        temp=s1;
        s1 = state_a1*in_data[i] + state_b1*s1 - state_b2*s2;
        s2 = state_a2*in_data[i] + state_b1*s2 + state_b2*temp;
        if (i>=990)s1.show();
    }
}
```

An example PCL 118 that is used to generate development object code 128 from development code 112 shown above is shown below, implemented in the C++ programming language. Three numeric types are implemented: signed fractions with a range of +/−1, signed fractions with a range of +/−2, and an extended precision accumulator. These represent a subset of a typical class library for a 16-bit DSP, with a 16×16 multiplier and a greater than 32-bit accumulator. The following assumptions are made about the DSP architecture:

(1) Data is nominally 16 bits, with fractional representation.

(2) Multiplies are signed, and generate a 31 bit result, also fractional.

(3) The accumulation of those products are done with guard bits to prevent overflow.

(4) The output of the accumulation is rounded (by adding 0.5 lsb) to 16 bits, and saturated if greater than a logic +/−1.

Two different logical ranges are supported for 16 bit data types, one with the binary point to the right of the sign bit (supports +/−1), the other with the binary point one more bit to the right (supports a logical +/−2). Only a very minimal show operation is included for this demonstration for output of the true and current values. In production code, the stream I/O are typically supported, as well as functions to derive various statistics. When the code is targeted to an actual DSP, another library (PCL 116) is used that does not have these mathematical debug tools attached.

Copyright 1997 Audiologic, Inc.

```
#include <math.h>
#include <ostream.h>
#include <istream.h>
#include <stdlib.h>
class f1_16;
class f2_16;
class accum;
/************************************************************
 *
 *                              DEMO DSP DATA TYPES LIBRARY
 *    DEMONSTRATES THE VALUE OF HAVING HIDDEN
 *    MATHEMATICAL TRACKING IN VARIABLE FOR C++
 *    DEVELOPMENT OF CODE FOR DSPS.
 *
 ************************************************************
/
/************************************************************
 *
 DSP data types
 ************************************************************/
class accum{  //fractional data, simulates and accumulator (extended
```

-continued
```
precision)
    long double x, xd;    // data, "true" data
    friend accum operator* (const f1_16&, const f1_16&);
    friend accum operator* (const f2_16&, const f1_16&);
    friend accum operator* (const f1_16&, const f2_16&);
    friend accum operator+ (const accum& a, const accum& b) ;
    friend accum operator- (const accum& a, const accum& b) ;
    friend class f1_16;
    friend class f2_16;
public:
    operator f1_16() const;
    void show() {
        cout<<"val= "<<x<<" error= "<<x-xd<<"\n";
    }
};
// In the 16 bit fractional data types, the fixed point value, the floating
// point "true" value, and information to generate the rms error are carried.
//
//
class f1_16{      // fractional data, range -+1, 16 bits
    friend accum operator* (const f1_16&, const f1_16&);
    friend accum operator* (const f2_16&, const f1_16&);
    friend accum operator* (const f1_16&, const f2_16&);
    friend accum operator+ (const accum& a, const accum&b) ;
    friend accum: :operator f1_16 () const;
    short x;           // actual data (fixed point 125)
    long double xd;    // "true" data value (floating point 126)
    long double xe;    // rms**2 error from true value
    long n;            // number of writes to this variable
    long sats;         // number of clips writing to this variable
    inline short d_2_f (double d) {
        d=floor(d*32768.+.5);     // assume rounding
        if (d>32767.) {sats++;return 32767;}
        if (d<-32768.) {sats ++;return -32768;}
        return static_cast<short>(d);
    }
public:
    f1_16 () :x (0) ,xd (0) ,xe (0) ,n(0) ,sats (0) {} // constructors
    f1_16 (double d) :n(1) ,sats(0) {
        x=d_2_f (xd=d) ;
        xe=(xd-x/32768.)*(xd-x/32768.) ;
    }
    f1_16& operator= (const accum& a) {
        x=d_2_f(a.x) ;
        xd=a.xd;
        xe+=(xd-x/32768.)*(xd-x/32768.) ;
        n++;
        return *this;
    }
    f1_16& operator= (const f1_16&a) {
        xd=a.xd;
        x=a.x;
        xe+=(xd-x/32768.)*(xd-x/32768.) ;
        n++;
        return *this;
    }
    void show() {
        cout<<"val= "<<x/32768.<<" error (ls bits)= "<<x-32768.*xd<<" rms error (ls bits)= "<<32768.*sqrt (xe/n)<<"\n";
    }
};
class f2_16{      // fractional data, range -+2, 16 bits
    friend accum operator* (const f2_16&, const f1_16&);
    friend accum operator* (const f1_16&, const f2_16&);
    short x;           // actual data
    long double xd;    // "true" data value
    long double xe;    // rms**2 error from true value
    long n;            // number of writes to this variable
    long sats;         // number of clips writing to this variable
    inline short d_2_f2 (double d) {
        d=floor(d*16384.+.5);     // assume rounding
        if(d>32767.) {sats++;return 32767;}
        if(d>-32767.) {sats++;return -32767;}
        return static_cast<short>(d);
    }
public:
    f2_16 () :x (0), xd (0) ,xe(0) ,n(0) ,sats(0) {} // constructors
    f2_16 (double d) :n(1) ,sats(0) {
        x=d_2_f2 (xd=d) ;
        xe=(xd-x/16384.)*(xd-x/16384.) ;
    }
    f2_16& operator= (const accum& a) {
        x=d_2_f2 (a.x) ;
        xd=a.xd;
        xe+=(xd-x/16384.)*(xd-16384.);
        n++;
        return *this;
    }
    void show() {
        cout<<"val= "<<x/16384.<<" error= "<<x/16384.-xd<<" rms error= "<<sqrt (xe/n) <<"\n";
    }
};
inline accum operator* (const f1_16& a,const f1_16& b) {
    accum t;
    t.x=(a.x/32768.)*(b.x/32768.); // integer, fixed point, data
    t.xd=a.xd*b.xd;                // floating point data
    return t;
}
inline accum operator* (const f2_16& a,const f1_16& b) {
    accum t;
    t.x=(a.x/16384.)*(b.x/32768.) ;
    t.xd=a.xd*b.xd;
    return t;
}
inline accum operator* (const f1_16& a,const f2_16& b) {
    accum t;
    t.x=(a.x/32768.)*(b.x/16384.);
    t.xd=a.xd*b.xd;
    return t;
}
inline accum operator+ (const accum& a, const accum&b) {
    accum t;
    t.x=a.x+b.x;
    t.xd=a.xd+b.xd;
    return t;
}
inline accum operator- (const accum& a, const accum&b) {
    accum t;
    t.x=a.x+b.x;
    t.xd=a.xd+b.xd;
    return t;
}
```

Executing the foregoing filter with the foregoing libraries gives the results shown below. Note that the output shows that there is much more rounding error in the direct form filter.

direct form results val=0.0155029 error (ls bits)=385.077 rms error (ls bits)= 253.226 val=0.0153809 error (ls bits)=391.346 rms error (ls bits)= 253.403 val=0.0153198 error (ls bits)=397.181 rms error (ls bits)= 253.589 val=0.0151672 error (ls bits)=402.794 rms error (ls bits)= 253.783 val=0.0149231 error (ls bits)=408.035 rms error (ls bits)= 253.985 val=0.0145874 error (ls bits)=412.617 rms error (ls bits)= 254.194 val=0.0141602 error (ls bits)=416.53 rms error (ls bits)= 254.409 val=0.0138245 error (ls bits)=420.685 rms error (ls bits)= 254.63 val=0.0134583 error (ls bits)=425.074 rms error (ls bits)= 254.857 val=0.0130615 error (ls bits)=429.264 rms error (ls bits)= 255.091

State Variable Results:
  val=0.0038147 error (ls bits)=2.07748 rms error (ls bits)=3.5345
  val=0.00350952 error (ls bits)=2.34605 rms error (ls bits)=3.53351
  val=0.00326538 error (ls bits)=2.18081 rms error (1s bits)=3.5324
  val=0.00292969 error (ls bits)=1.79441 rms error (ls bits)=3.53109
  val=0.00253296 error (ls bits)=2.0353 rms error (ls bits)=3.5299
  val=0.00204468 error (ls bits)=1.61672 rms error (ls bits)=3.5285
  val=0.00149536 error (ls bits)=1.52983 rms error (ls bits)=3.52707
  val=0.0010376 error (ls bits)=1.68464 rms error (ls bits)=3.52571
  val=0.000549316 error (ls bits)=2.0742 rms error (ls bits)=3.52455
  val=3.05176e−005 error (ls bits)=2.26359 rms error (ls bits)=3.52352

Theerrors are in units of the least significant bit, and it can be seen that for the example filter design, the state variable formulation is much more accurate.

As discussed above, in addition to errors, other useful information for development or debug (shown as code development information 120 in FIGS. 1 and 2) can be carried in the class objects. In addition, debug tools can be added to the classes to show the statistics (these tools would perform no operation when compiled with the RCL). For debug purposes, it is possible to use the accurate value for some of the variables, allowing the source of a numeric problem to be identified.

What is claimed is:

1. A system for developing executable code having fixed point code for execution by a digital signal processor comprising circuitry for performing fixed point arithmetic, the system comprising:
   a testing library comprising
      a plurality of first variable types, each of said first variable types corresponding to a fixed point arithmetic function, and
      a plurality of second variable types, each of said second variable types corresponding to a floating point arithmetic function,
      wherein each of said first variable types is associated with one of said second variable types which performs substantially the same function;
   a code development compiler, for receiving a computer program having a function performed using said first variable type and for generating object code, said object code having a function implemented in accordance with both said first variable types and said second variable types for each of said functions; and
   a code development module, coupled to said code development compiler, for receiving test data and generating a first set of results using said first variable functions and generating a second set of results using corresponding second variable types to enable identification of differences in the first and second sets of results.

2. The system of claim 1, wherein said computer program is modified based upon differences between said first and second set of results.

3. (New) The system of claim 2, further comprising:
   a code compiler, disposed to receive said modified computer program, for generating target object code having the function implemented in accordance with said first variable types, said object code not implementing the function in accordance with said second variable type.

4. The system of claim 3, further comprising:
   a digital signal processor for executing said target object code, said digital signal processor having fixed point processing circuitry.

5. A method for generating target code for execution by a digital signal processor having fixed point processing circuitry, the method comprising the steps of:
   receiving a computer program including the use of a first mathematical function;
   compiling said computer program to generate development code, said development code having object code implementing said mathematical function using both a first variable type corresponding to a fixed point arithmetic function and a second variable type corresponding to a floating point arithmetic function;
   receiving test data;
   executing said development code using said test data to generate a first set of outputs corresponding to the execution of said development code using said first variable types and to generate a second set of outputs corresponding to the execution of said development code using said second variable types.

6. The method of claim 5, further comprising the step of:
   determining the difference between said first and second sets of outputs, said difference representing variations in the execution of said first and second variable types.

7. The method of claim 6, further comprising the step of:
   modifying said computer program to reduce said difference between said first and second outputs.

8. The method of claim 6, further comprising the step of:
   compiling said computer program to generating the target code, said target code having object code implementing said mathematical function using said first variable type and not said second variable type.

9. The method of claim 7, further comprising the steps of:
   compiling said modified computer program to generate modified development code, said modified development code having object code implementing said mathematical function using both a first variable type corresponding to a fixed point arithmetic function and a second variable type corresponding to a floating point arithmetic function;
   receiving test data;
   executing said modified development code using said test data to generate a modified first set of outputs corresponding to the execution of said modified development code using said first variable types and to generate a modified second set of outputs corresponding to the execution of said modified development code using said second variable types.

10. The method of claim 9, further comprising the step of:
    determining a modified difference between said modified first set of outputs and said modified second set of outputs, said modified difference representing variations in the execution of said first and second variable types.

11. The method of claim 10, further comprising the step of:
    compiling said modified computer program to generating the target code, said target code having object code implementing said mathematical function using said first variable type and not said second variable type.

12. A system for generating target code for execution by a digital signal processor having fixed point processing circuitry, the system comprising:

compiling means for receiving a computer program including the use of a first mathematical function and for compiling said computer program to generate development code, said development code having object code implementing said mathematical function using both a first variable type corresponding to a fixed point arithmetic function and a second variable type corresponding to a floating point arithmetic function;

processing means for receiving test data and for executing said development code using said test data to generate a first set of outputs corresponding to the execution of said development code using said first variable types and to generate a second set of outputs corresponding to the execution of said development code using said second variable types.

13. The system of claim 12, further comprising:

determining means for determining the difference between said first and second sets of outputs, said difference representing variations in the execution of said first and second variable types.

14. The system of claim 13, further comprising:

modifying means for modifying said computer program to reduce said difference between said first and second outputs.

15. The system of claim 16, further comprising:

target compiling means, for compiling said computer program to generating the target code, said target code having object code implementing said mathematical function using said first variable type and not said second variable type.

16. The system of claim 14, wherein said compiling means compiles said modified computer program to generate modified development code, said modified development code having object code implementing said mathematical function using both a first variable type corresponding to a fixed point arithmetic function and a second variable type corresponding to a floating point arithmetic function.

17. The system of claim 16, wherein said processing means receives test data and executes said modified development code using said test data to generate a modified first set of outputs corresponding to the execution of said modified development code using said first variable types and to generate a modified second set of outputs corresponding to the execution of said modified development code using said second variable types.

18. The system of claim 17, wherein said determining means determines a modified difference between said modified first set of outputs and said modified second set of outputs, said modified difference representing variations in the execution of said first and second variable types.

19. The system of claim 18, further comprising:

target compiling means, for compiling said modified computer program to generating the target code, said target code having object code implementing said mathematical function using said first variable type and not said second variable type.

* * * * *

UNITED STATES PATENT AND TRADEMARK OFFICE
CERTIFICATE OF CORRECTION

PATENT NO. : 6,256,776 B1  
DATED : July 3, 2001  
INVENTOR(S) : John L. Melanson It is certified that error appears in the above-identified patent and that said Letters Patent is hereby corrected as shown below:

<u>Column 9,</u>
Line 65, please delete the word "(New)".

<u>Column 11,</u>
Line 29, please delete "16" with -- 13 --.

Signed and Sealed this

Sixteenth Day of April, 2002

Attest:

Attesting Officer

JAMES E. ROGAN  
*Director of the United States Patent and Trademark Office*